UNITED STATES PATENT OFFICE.

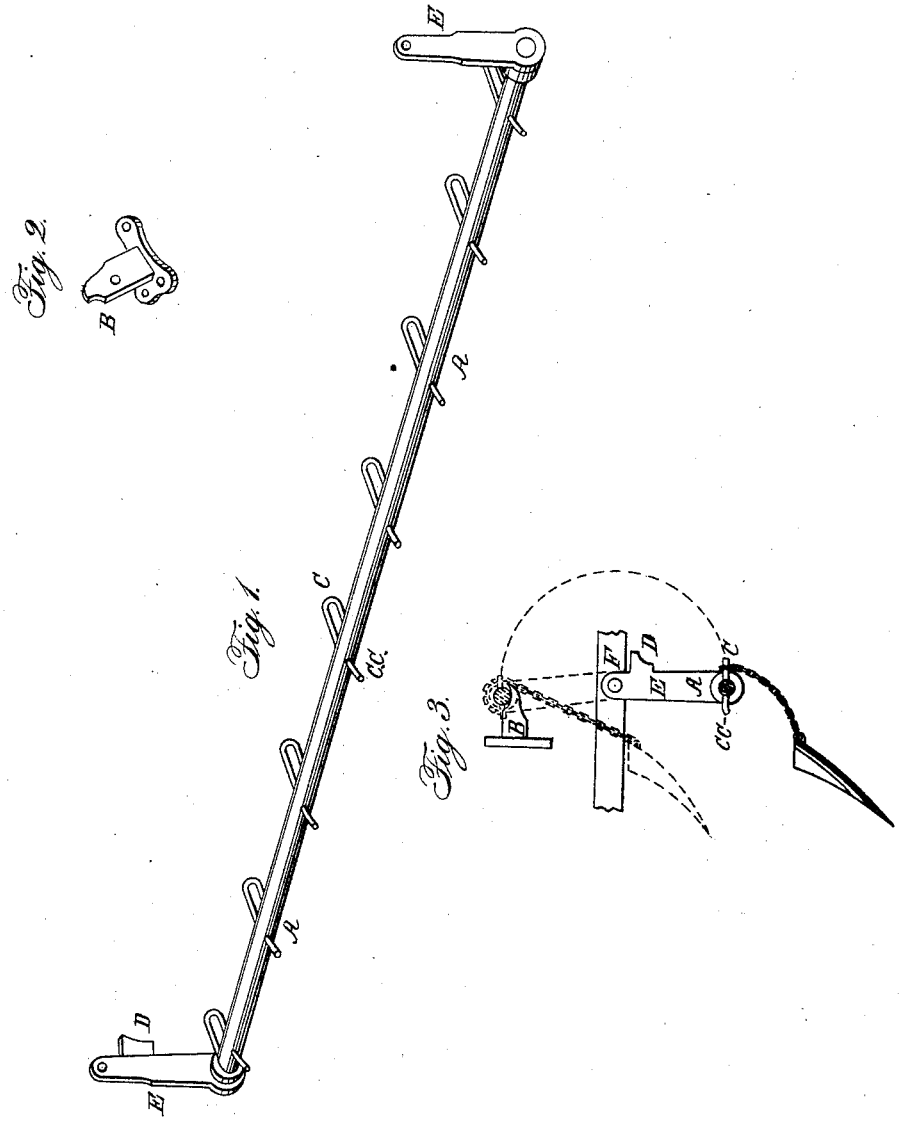

DANL. E. McSHERRY, OF DAYTON, OHIO.

IMPROVEMENT IN SEEDING-MACHINES.

Specification forming part of Letters Patent No. 45,424, dated December 13, 1864.

*To all whom it may concern:*

Be it known that I, DANIEL E. MCSHERRY, of Dayton, in the county of Montgomery and State of Ohio, have invented a new and useful Improvement in a Grain or Seed Drill, the object of which is to raise or lower the shovels or hoes on a grain or seed drill, and also to throw the land-measure out of gear, so that it shall cease to register when the flow of seed stops.

A A is a lift-bar of round or square iron.

B is a rest screwed against the grain-box of the drill, and supports the lift-bar when the shovels or hoes are raised.

C is a staple passing through the lift-bar. One end of the staple projects from the opposite side of the bar and serves as a pin upon which to hook the chain supporting the shovel or hoe.

D is a projection on the lever-hinge, and serves as a catch, which, striking upon the end of the land-measure as the lift-bar is raised, throws the land-measure out of gear, when it ceases to register at the same time that the flow of seed is cut off.

The arms E E are attached to the frame of the machine by pins or pivot-joints, as shown at F in Figure 3, in such a manner that the lift-bar A, with the drill-teeth attached, can be lifted to the position indicated by the red lines and caused to rest upon the support B.

What I claim as my improvement, and desire to secure by Letters Patent, is—

1. The lift-bar A, when constructed as described, with loops C and hooks C C, the same being attached to the frame of the machine by means of the suspended arms E E and held in its elevated position by means of the support B, as herein set forth.

2. The projection D on the arm E, when used in connection with the lifting-rod A, as and for the purpose specified.

D. E. McSHERRY.

Witnesses:
 EDWARD BRENEMAN,
 WARREN MUNGER, Jr.